(12) United States Patent
Pickering

(10) Patent No.: US 12,462,256 B2
(45) Date of Patent: *Nov. 4, 2025

(54) METHODS AND SYSTEMS FOR A MOVEMENT-BASED AUTHENTICATION FOR A SERVICE

(71) Applicant: Worldpay, LLC, Symmes Township, OH (US)

(72) Inventor: Daren L. Pickering, Rugby (GB)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,619

(22) Filed: Jan. 30, 2024

(65) Prior Publication Data

US 2025/0246022 A1    Jul. 31, 2025

Related U.S. Application Data

(63) Continuation of application No. 16/413,281, filed on May 15, 2019, now Pat. No. 11,928,682.

(51) Int. Cl.
*G06V 40/20* (2022.01)
*H04L 9/32* (2006.01)

(52) U.S. Cl.
CPC ............ *G06V 40/20* (2022.01); *H04L 9/3247* (2013.01)

(58) Field of Classification Search
USPC ........................................................ 382/103
See application file for complete search history.

(56) References Cited

U.S. PATENT DOCUMENTS

| 7,948,357 B2 | 5/2011 | Bodin |
| 2012/0007713 A1 | 1/2012 | Nasiri et al. |

(Continued)

FOREIGN PATENT DOCUMENTS

| WO | WO-2011149940 A2 * | 12/2011 | ............. G06F 3/017 |
| WO | WO-2016025190 A1 * | 2/2016 | ........ G06Q 20/40145 |

OTHER PUBLICATIONS

Lu, D., et al., "FMCode: A 3D In-the-Air Finger Motion Based User Login Framework for Gesture Interface", arXiv:1808.00130v1, Aug. 1, 2018. (Year: 2018).*

(Continued)

*Primary Examiner* — Clay C Lee
(74) *Attorney, Agent, or Firm* — Bookoff McAndrews, PLLC

(57) ABSTRACT

Systems and methods are disclosed for movement-based signature authentication. One method comprises determining one or more features associated with a user based on one or more two-dimensional images and determining one or more body points associated with the user based on one or more three-dimensional images. A movement pattern of each body point of the user is determined based on the one or more three-dimensional images. The one or more determined features are compared to corresponding one or more stored features associated with the user. If the one or more detected features match the one or more stored features, the one or more determined movement patterns are compared to a unique electronic signature associated with the user. Upon determining that the one or more determined movement patterns match the unique electronic signature, the user is authenticated for electronic transaction.

20 Claims, 7 Drawing Sheets

(56) References Cited

U.S. PATENT DOCUMENTS

| | | |
|---|---|---|
| 2014/0165187 A1 | 6/2014 | Daesung et al. |
| 2014/0286644 A1* | 9/2014 | Oshima ................. H04B 10/11 398/118 |
| 2014/0365333 A1* | 12/2014 | Hurewitz ........... G06Q 30/0201 705/26.7 |
| 2014/0365782 A1* | 12/2014 | Beatson ............. G06V 30/1478 713/186 |
| 2015/0039458 A1 | 2/2015 | Reid |
| 2015/0177842 A1* | 6/2015 | Rudenko ................ G06F 3/017 345/156 |
| 2016/0162673 A1* | 6/2016 | Kutliroff ................ G06F 18/28 382/115 |
| 2017/0180336 A1 | 6/2017 | Josephson et al. |
| 2018/0096196 A1 | 4/2018 | Gordon |
| 2018/0349583 A1 | 12/2018 | Turgeman et al. |
| 2019/0005479 A1 | 1/2019 | Glaser et al. |
| 2019/0342329 A1* | 11/2019 | Turgeman ............. G06F 3/0488 |
| 2020/0218867 A1 | 7/2020 | Gandolfo |

OTHER PUBLICATIONS

International Search Report and Written Opinion issued in International Application No. PCT/US2020/030586, issued Jul. 14, 2020 (13 pages).

* cited by examiner

METHODS AND SYSTEMS FOR A MOVEMENT-BASED AUTHENTICATION FOR A SERVICE

CROSS-REFERENCE TO RELATED APPLICATION(S)

This patent application is a continuation of and claims the benefit of priority to U.S. application Ser. No. 16/413,281, filed on May 15, 2019, the entirety of which is incorporated herein by reference.

TECHNICAL FIELD

The present disclosure relates to methods and systems for movement-based signature authentication. More particularly, the present disclosure relates to generating a unique electronic signature based on user movements in a three-dimensional space. The present disclosure further relates to authenticating a user based on comparing detected user movement patterns to the generated unique electronic signature.

BACKGROUND

Traditionally, merchants and other store owners have point of sale (POS) terminals that can accept check or payment cards from consumers for goods and services. Such POS systems may include personal identification number (PIN) pads at which a consumer may enter payment or user authentication information (e.g., a PIN, card verification value (CVV), passcode, answer to a secret question, etc.) in order to complete payment processing. Increasingly, merchants and store owners may interact with consumers in virtual reality environments or remotely over the web (e.g., consumers may make online purchases using consumer devices). Consumers making purchases in virtual reality or web environments may input authentication information using virtually-created PIN pads or other input devices, such as, e.g., keyboard, an electronic PIN pad or a keyboard displayed on a touchscreen, etc.

Authentication data that can be entered via PIN pads and keyboards comprise a sequence of alphanumeric characters (and special symbols in some cases). Authentication data of this nature may be easily detected by an observer nearby the user entering the authentication data, or may be stolen by a data thief hacking into a computing system storing such data. Subsequently, entry or provision of such authentication data may be replicated by simply entering the stolen data using PIN pads, keyboards, etc.

Accordingly, there is a need for improving security in transactions involving and/or requiring entry or provision of authentication data. More particularly, there is a need for systems and methods that allow users to provide authentication data in a theft-resistant and unique manner, such that user's entry or provision of authentication data cannot be replicated successfully by an unauthorized party.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for movement-based signature authentication, comprising: determining, by a user movement signature authentication server, one or more features associated with a user based on one or more two-dimensional (2D) images of the user; determining, by the user movement signature authentication server, one or more body points associated with the user based on one or more three-dimensional (3D) images of the user; determining, by the user movement signature authentication server, a movement pattern of each of the one or more detected body points based on the one or more 3D images of the user; comparing, by the user movement signature authentication server, the one or more determined features to corresponding one or more stored features associated with the user; upon determining that the one or more determined features match the one or more stored features associated with the user, comparing, by the user movement signature authentication server, the one or more determined movement patterns to a unique electronic signature associated with the user; and upon determining that the one or more determined movement patterns match the unique electronic signature associated with the user, authenticating, by the user movement signature authentication server, the user for an electronic transaction.

One embodiment provides a system for movement-based signature authentication. The system may comprise one or more processors; and a non-transitory computer readable medium storing instructions which, when executed by the one or more processors, cause the one or more processors to perform a method comprising: determining, by a user movement signature authentication server, one or more features associated with a user based on one or more two-dimensional (2D) images of the user; determining, by the user movement signature authentication server, one or more body points associated with the user based on one or more three-dimensional (3D) images of the user; determining, by the user movement signature authentication server, a movement pattern of each of the one or more detected body points based on the one or more 3D images of the user; comparing, by the user movement signature authentication server, the one or more determined features to corresponding one or more stored features associated with the user; upon determining that the one or more determined features match the one or more stored features associated with the user, comparing, by the user movement signature authentication server, the one or more determined movement patterns to a unique electronic signature associated with the user; and upon determining that the one or more determined movement patterns match the unique electronic signature associated with the user, authenticating, by the user movement signature authentication server, the user for an electronic transaction.

One embodiment provides a non-transitory computer readable medium for movement-based signature authentication. The non-transitory computer readable medium may store instructions that, when executed by one or more processors, cause the one or more processors to perform a method comprising: determining, by a user movement signature authentication server, one or more features associated with a user based on one or more two-dimensional (2D) images of the user; determining, by the user movement signature authentication server, one or more body points associated with the user based on one or more three-dimensional (3D) images of the user; determining, by the user movement signature authentication server, a movement pattern of each of the one or more detected body points based on the one or more 3D images of the user; comparing, by the user movement signature authentication server, the one or more determined features to corresponding one or more stored features associated with the user; upon determining that the one or more determined features match the one or more stored features associated with the user, comparing, by the user movement signature authentication server, the one or more determined movement patterns to a unique electronic signature associated with the user; and upon determining that the one or more determined movement patterns match the unique electronic signature associated with the user, authenticating, by the user movement signature authentication server, the user for an electronic transaction.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
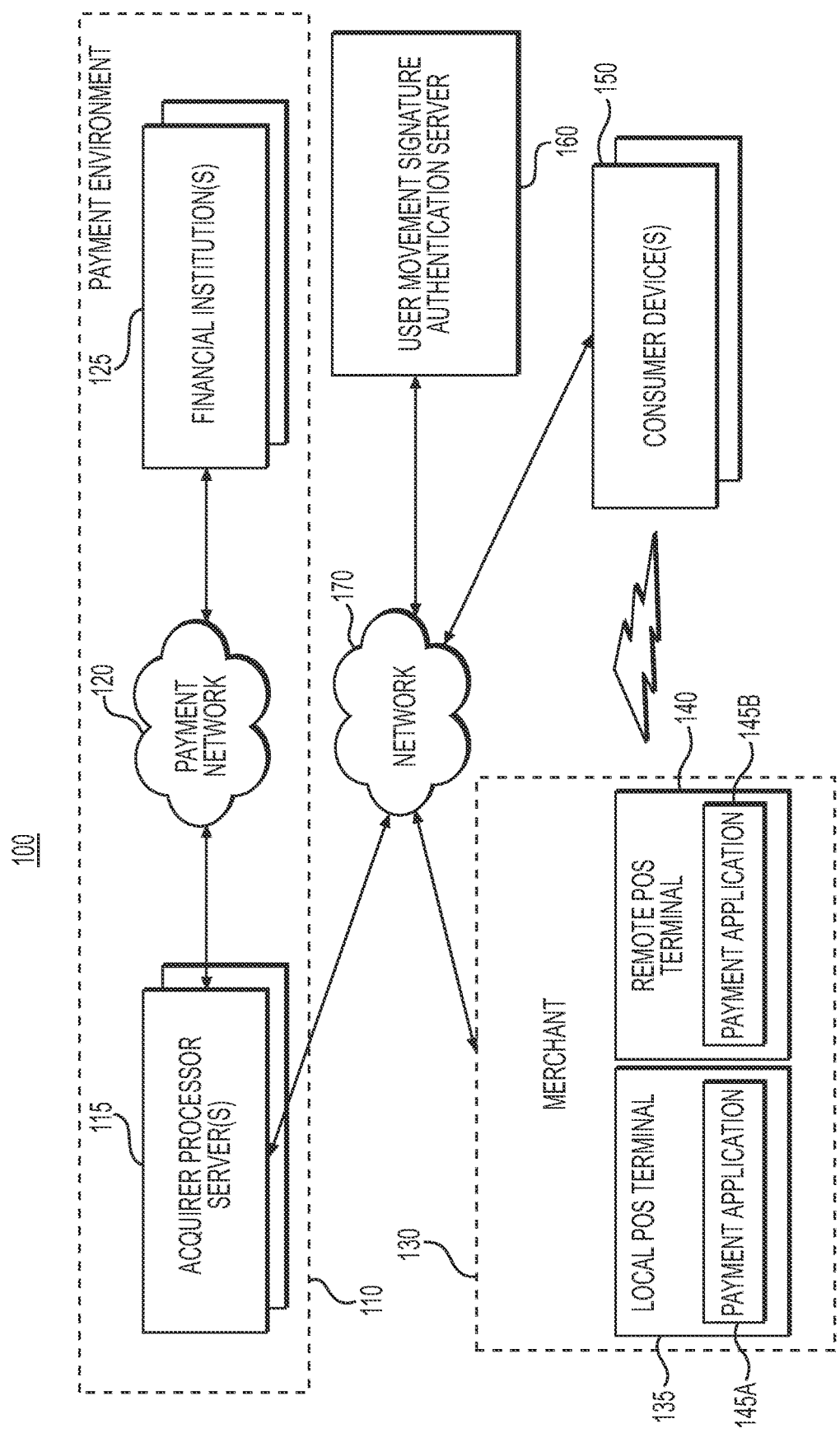
FIG. 1 depicts a block diagram of an electronic payment transaction processing system, according to one aspect of the present disclosure.

The following embodiments describe methods and systems for movement-based signature authentication. More particularly, the present disclosure relates to generating a unique electronic signature based on user movements in a three-dimensional space. The present disclosure further relates to authenticating a user based on comparing detected user movement patterns to the generated unique electronic signature.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows may be provided by reference to a "payment vehicle" or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

Traditionally, merchants and other store owners may accept payment/user authentication data (e.g., PIN, CVV, passcode, answer to a secret question, etc.) via point of sale (POS) devices that have buttons arranged in a standardized format of alphanumeric characters. The standardized format may be seen in standard PIN Pad and keyboard layouts. Authentication data that can be entered via PIN pads and keyboards comprise a sequence of alphanumeric characters (and special symbols in some cases). Authentication data of this nature may be easily detected by an observer, or may be stolen by a data thief hacking into a computer system storing such data. Subsequently, entry or provision of such authentication data may be replicated by simply entering the stolen data using PIN pads, keyboards, etc.

The disclosed systems and methods provide an improvement to the current problem of easily-replicable authentication data, by providing a movement-based authentication technique. There are three ways of proving one's identity: by means of something that one possesses (e.g., a key to one's vehicle, a document, a card, a badge, etc.), by means of something that one knows (e.g., a name, a secret, a password, a PIN, etc.), or by means of something that one is (e.g., a fingerprint, a face, etc.). In techniques presented herein, the authentication method may utilize a combination of i) the means of something that one knows and ii) the means of something that one is, for a more robust and secure authentication.

In one aspect, the present embodiment may be implemented in a payment authentication environment in which a user may be prompted to provide a movement-based signature (i.e., a signature move) for authentication. In response to the prompt, the user may make a signature move. A signature move may comprise a plurality of user poses, or a sequence of continuous user movements (such as, e.g., a dance movement). Using one or more sensors, a motion capture system may capture the user movements in two-dimensional (2D) and/or three-dimensional (3D) images. User movement patterns may be identified from the images and may be compared to a unique electronic signature representing expected movement patterns. The expected movement patterns constituting the unique electronic signature may be kept a secret. However, even if a rogue party knows of the expected patterns and closely mimics the expected movement patterns for authentication, a successful replication may be impossible due to varying physical dimensions between individuals. The movement-based authentication may be used in conjunction with other types of biometric authentication methods, such as face recognition, fingerprint recognition, etc., to facilitate a multifactor authentication in one, seamless process. The combination of biometrics authentication and movement-based authentication creates a robust authentication system suitable for a wide range of uses cases.

Referring now to the appended drawings, FIG. 1 depicts a block diagram of an electronic payment transaction processing system 100, according to one aspect of the present disclosure. In general, FIG. 1 depicts a payment environment 110, a merchant 130, a user movement signature authentication server 160, and consumer device(s) 150, all connected via network 170. Network 170 may include the Internet, but may also include other networks such as a corporate WAN, cellular network, satellite network, or combination thereof, for example. The network 170 may be employed to enable data communications between the various entities illustrated in FIG. 1.

In an electronic payment transaction processing system 100 of FIG. 1, a consumer (i.e., a user), during a checkout process with a merchant 130, may make an electronic payment using a local point of sale (POS) terminal 135. Local POS terminal 135 may comprise a computing system consistent with or similar to that depicted in FIG. 6, and may handle face-to-face or in-person transactions. Face-to-face or in-person transactions may refer to local transactions taking place between a merchant 130 and a consumer present in a same venue or location, or in close physical proximity to each other (e.g., during a meeting between the merchant 130 and the consumer, at a brick-and-mortar store of the merchant 130, etc.). In one embodiment, local POS terminal 135 may be a mobile device of the merchant 130 (or a party selling goods/services to a consumer), the mobile device comprising a computing system consistent with or similar to that depicted in FIG. 6. The term "mobile device" used herein may refer to a smart phone, a table, a laptop, a smart watch, a smart ring, a wearable and/or smart device, a gaming device, a handheld computer, a portable media player, or any other mobile or portable computing device. Local POS terminal 135 may be configured to leverage an external card reader peripheral device to become an ad hoc Point of Sale (POS) platform, using payment application 145A. In other embodiments, local POS terminal 135 may be a POS terminal located at a brick-and-mortar store of the merchant, using payment application 145A to process electronic payment transactions Merchant 130 may also comprise a remote POS terminal 140. The remote POS terminal 140 may comprise a server consistent with or similar to the computing system depicted in FIG. 6, and may handle transactions that occur over a network 170 with consumer devices 150. The consumer device 150 may include, but may not be limited to, a virtual reality (VR) consumer product (e.g., a VR headset, VR or augmented reality (AR) eyewear, a VR immersive system, etc.), a smartphone, a mobile phone, a tablet computer, a laptop, a portable computer, a desktop computer, a watch, a ring, a wearable and/or smart device, etc. The remote POS terminal 140 may be in communication with the consumer devices 150 over the network 170 and may provide an electronic payment interface to the consumer devices 150, using payment application 145B. The electronic payment interface may be provided in a variety of forms. In one embodiment, the electronic payment interface may be a web page where a user of the consumer device 150 (i.e., a consumer) can provide payment vehicle information as well as the corresponding authentication data (e.g., PIN, password, CVV, answer to a secret question, signature move, etc.). In another embodiment, the electronic payment interface may be a virtual reality environment where a user can provide a payment vehicle (or payment vehicle information) as well as the corresponding authentication data. In yet another embodiment, the electronic payment interface may be a web-based application through which a user can provide a payment vehicle (or payment vehicle information) as well as the corresponding authentication data. In yet another embodiment, the electronic payment interface may provide an installable mobile application to the consumer devices 150, so that a consumer may use the mobile application to access an electronic payment interface to provide a payment vehicle (or payment vehicle information) as well as the corresponding authentication data.

The electronic payment transaction processing system 100 may also comprise a user movement signature authentication server 160. As will be discussed in greater detail below, the user movement signature authentication server 160 may process movement-based authentication data provided by consumers in their respective environments. For example, when a consumer provides a payment vehicle at a POS terminal (i.e., local POS terminal 135 or remote POS terminal 140), the POS terminal may request authentication data from the consumer. Instead of using a PIN pad or a keyboard, the consumer may provide authentication data in the form of a signature move, via a movement-based authentication data entry interface. The movement-based authentication data entry interface may be enabled by the user movement signature authentication server 160 and a motion capture system coupled thereto. By using the movement-based authentication data entry interface, the likelihood of a successful entry/provision of authentication data by an unauthorized party may be substantially reduced. The user movement signature authentication server 160 may comprise a computing system consistent with or similar to that depicted in FIG. 6. The user movement signature authentication server 160 may comprise a data storage where a plurality of unique electronic signatures associated with consumers are stored. The user movement signature authentication server 160 may enable consumers to initially set up their unique electronic signatures using the movement-based authentication data entry interface. Each unique electronic signature may thus comprise a set of expected movement patterns initially set up by the associated consumer, and may later be compared with a signature move provided by the consumer for payment/user authentication.

Because merchant 130 generally may use a bank or financial institution that is different from that of the consumer, an acquirer processor server 115 may handle the electronic payment transactions between the financial institution of the consumer and that of the merchant 130. Upon receiving a payment vehicle (or payment vehicle information) and the corresponding authentication data, the POS terminal (i.e., local POS terminal 135 or remote POS terminal 140) may send an electronic payment authorization request by way of the network 170 to an acquirer processor server 115. Acquirer processor server 115 may then request, by way of payment network 120, an electronic transfer of funds to or from the financial institution 125 associated with the merchant 130.

Figure 6:
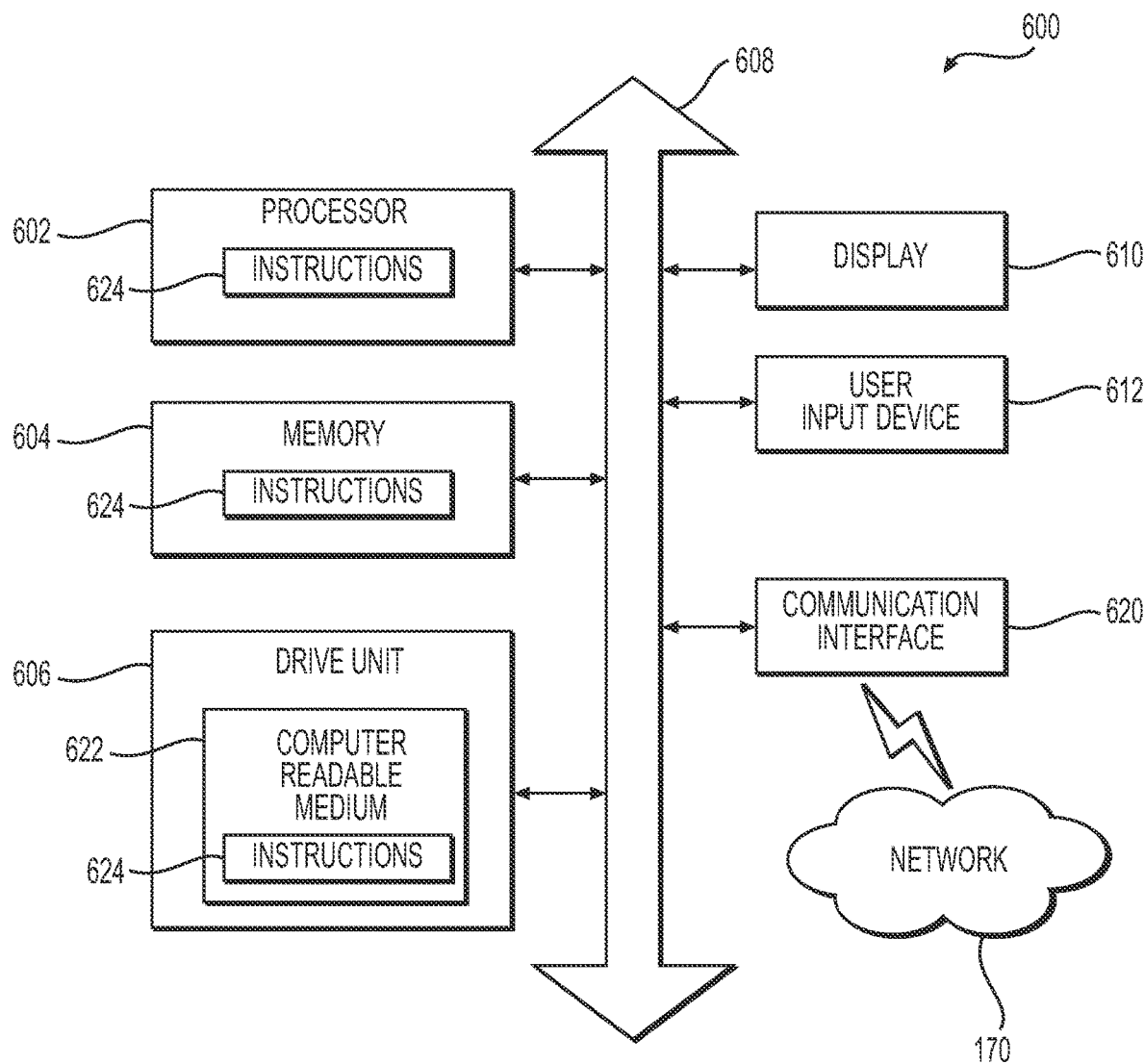
FIG. 6 illustrates an implementation of a general computer system that may execute techniques presented herein.

It should be noted that, although local POS terminal 135, remote POS terminal 140, user movement signature authentication server 160, and consumer device 150 are shown as separate entities in FIG. 1, at least a portion of these components (and the steps performed thereof) may be implemented in a single computing device consistent with or similar to that depicted in FIG. 6. For example, in one embodiment, user movement signature authentication server 160 and consumer device 150 may be implemented on a single computing device. In another embodiment, user movement signature authentication server 160 and a local POS terminal 135 may be implemented on a single computing device. In yet another embodiment, user movement signature authentication server 160 and a remote POS terminal 140 may be implemented on a single computing device. In yet another embodiment, local POS terminal 135, remote POS terminal 140, user movement signature authentication server 160, and consumer device 150 may indeed be implemented separately on their respective computing devices. The configurations specifically discussed herein regarding the arrangement of the components depicted in FIG. 1 are merely exemplary, and it would be obvious to a person of ordinary skill in the relevant art that different combinations of components may be implemented on a single or multiple computing devices.

Figure 2:
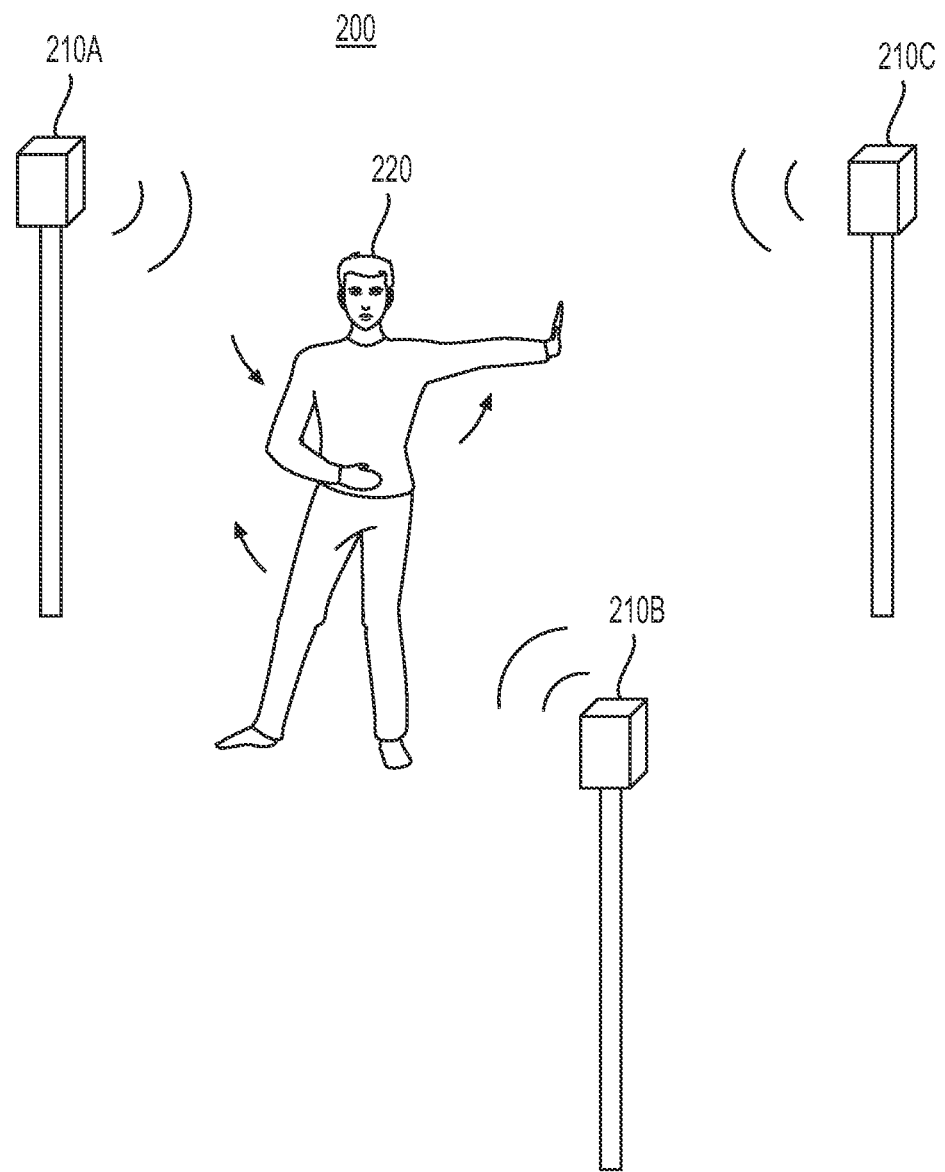
FIG. 2 depicts an exemplary motion capture system with which a movement-based authentication data entry interface may be implemented, according to one aspect of the present disclosure.

FIG. 2 depicts an exemplary motion capture system with which the movement-based authentication data entry interface of the present disclosure may be implemented. In one embodiment, motion capture system 200 may comprise one or more sensors 210A, 210B, and 210C. Motion capture system 200 may be implemented at the local POS terminal 135 and/or at the consumer device(s) 150. In some embodiments, motion capture system 200 may be part of a virtual reality (VR) or an augmented reality (AR) system, and an electronic payment interface and/or the movement-based authentication data entry interface may be presented within the VR or AR environment (i.e., on a display of a VR or AR system/headset). The one or more sensors 210A, 210B, and 210C may be in communication with the user movement signature authentication server 160 to enable the movement-based authentication data entry interface. Each of the sensors 210A, 210B, and 210C may comprise one or more depth sensors and/or one or more image sensors, such as, e.g., RGB cameras, etc. The sensors 210A, 210B, and 210C may be placed at specific locations within a three-dimensional space, such that the features and/or movement patterns of a user 220 may be accurately detected and tracked. In some embodiments, just one depth sensor and one image sensor may be sufficient to reliably detect and track user features and/or movements. However, more than one depth sensor and one image sensor may be used. An image sensor may be used to capture two-dimensional (2D), color images of a user, from which certain features unique to the user may be identified. The features may include, but may not be limited to, a face, a facial feature, a skin color, a hair color, a fingerprint, etc. A depth sensor may comprise two main components: an infrared projector and an image sensor. The infrared projector may project a pattern of infrared lights (which are invisible to humans) onto objects in a 3D space, creating a sea or pattern of dots on the objects. The image sensor, which may be configured to capture images in the infrared color range (e.g., an infrared camera, a CMOS sensor, etc.), may capture and send images comprising patterns of dots projected onto objects to a connected processor (e.g., a built-in processor, or a processor of the user movement signature authentication server 160). The processor may generate depth maps (i.e., depth images) based on an analysis of the dot patterns and/or an application of trigonometry (e.g., the more the dots are spread out on an object, the nearer the object from the depth sensor, and the denser the dots are on an object, the farther the object from the depth sensor). The depth maps may be generated by measuring the "time of flight" of the dot after it reflects off the object, to determine the distance between the dot and the depth sensor. However, the depth maps may be generated using any now-known or later-developed technique, and is not limited to the techniques specifically discussed herein. The generated depth maps may be used to model and/or reconstruct 3D shapes/images of the captured objects. Certain features and body points unique to a user may be identified from the 3D images of the user, as will be discussed in greater detail below.

Once a payment vehicle is accepted from a user 220 via an electronic payment interface presented at the local POS terminal 135 or the consumer device 150, the corresponding payment application (i.e., payment application 145A or payment application 145B) may prompt the user 220 to provide authentication data in the form of a signature move. Concurrently, the payment application may direct the user movement signature authentication server 160 to begin capturing the signature move of the user 220 (i.e., to initiate movement-based authentication data entry interface). For example, the user 220 may be prompted with a message "Show your signature move!" or "What is your signature move?" via a display of the local POS terminal 135 or the consumer device 150. In response, the user 220 may move his body parts in certain patterns, such that the detected movement patterns may match a unique electronic signature associated with the user. As discussed above, the unique electronic signature may be stored in a data storage of the user movement signature authentication server 160, and may comprise a set of expected movement patterns associated with the user 220. The user movement signature authentication server 160 may then compare the detected movement patterns to the unique electronic signature associated with the user 220, and may determine whether to authenticate the user based on the comparison.

Figure 3A:
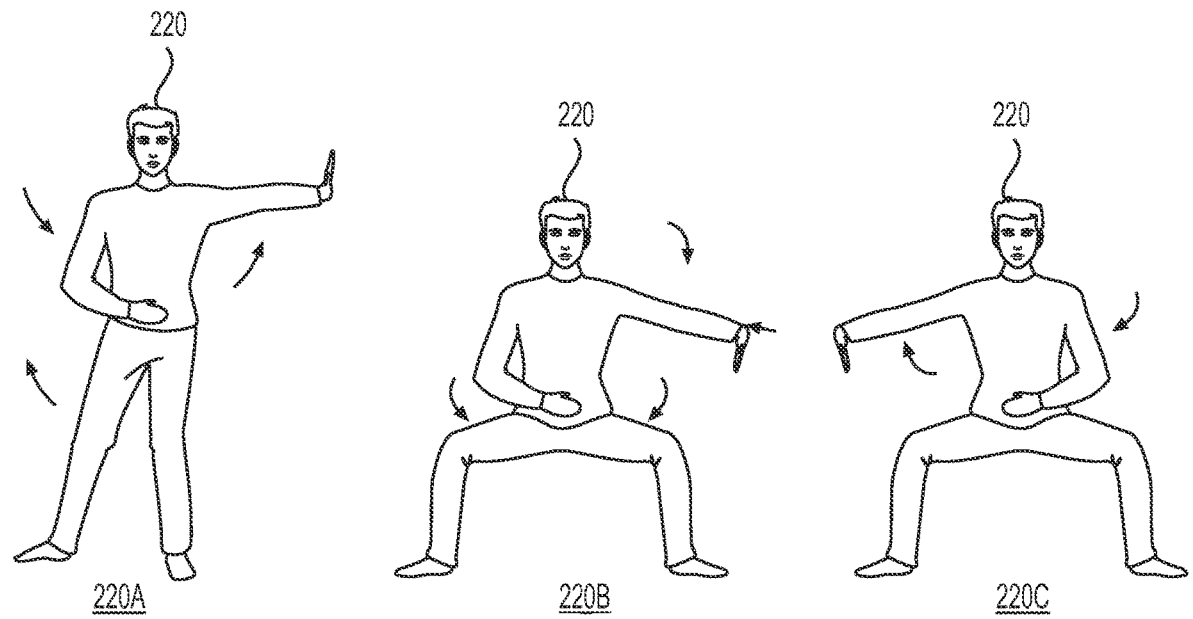
FIG. 3A depicts a user making a signature move at a movement-based authentication data entry interface, according to one aspect of the present disclosure.

Now with reference to FIGS. 3A-3D, an exemplary method of detecting features, body points, and movement patterns associated with a user will be described. FIG. 3A depicts a user 220 making a series of poses or movements 220A, 220B, and 220C as a signature move. One or more sensors 210A, 210B, and 210C (FIG. 2) may generate a plurality of 2D and 3D images of the user making the signature move. As discussed above, certain features may be identified using 2D images (e.g., a face, a facial feature, a skin color, a hair color, a fingerprint, etc.), and certain other features may be identified using 3D images (e.g., body points and/or segments, etc.). In some embodiments, the features identified from the 2D and 3D images may overlap. Nevertheless, the features identified from the 3D images may be used to more accurately detect movement patterns of the user, which may be compared with expected movement patterns of a unique electronic signature associated with the user.

Figure 3B:
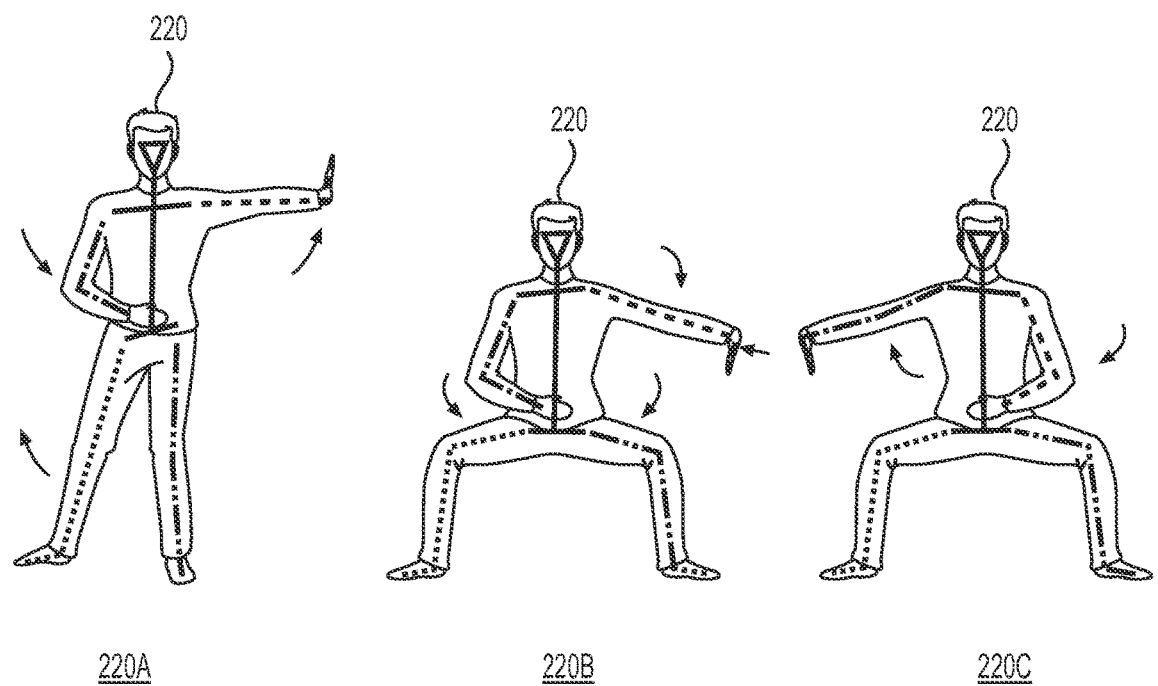
FIG. 3B depicts body points and segments identified from 3D images of the user making the signature move, according to one aspect of the present disclosure.
Figure 3C:
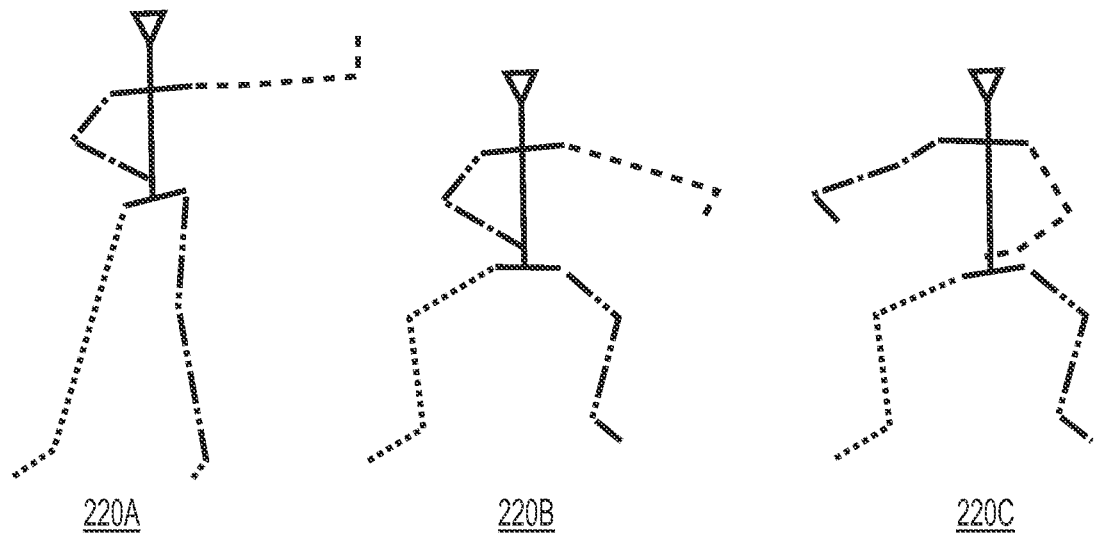
FIG. 3C depicts body points and segments extracted from the 3D images of the user making the signature move, according to one aspect of the present disclosure.

FIG. 3B depicts a plurality of body points and segments identified based on 3D images of the user making the signature move. Specifically, the body points and segments may be inferred using a machine learning model. To facilitate the machine-learning based feature detection, the movement-based authentication data entry interface implemented with the motion capture system 200 may initially be used to collect a large of amount of training data (e.g., 3D images of user movements), in order to analyze body points and segments across an entire user base. Other computing systems equipped with depth and image sensor(s) may also be used to provide training data. These computing systems may allow human evaluator(s) to manually identify and validate body points and segments in 3D images, and also manually connect validated body points in each 3D image to construct a skeletal structure. The collected data may be used to train a machine learning model to be representative of body points and segments across an entire user base. The machine learning model may be continuously or periodically updated as more training data become available, and the updated machine learning model may be periodically provided to the user movement signature authentication server 160. The user movement signature authentication server 160 may then use the trained machine learning model to correctly identify body points and segments within 3D images of a user, as illustrated in FIG. 3B. For example, the user movement signature authentication server 160, using the trained machine learning model, may be able to identify a head, a neck, a shoulder span, a torso, upper arms, lower arms, right and left hands, a hip span, upper legs, lower legs, right and left feet, etc. FIG. 3C depicts the identified body segments extracted from the underlying 3D images. In addition to identifying the body segments, the user movement signature authentication server 160 may also be able to identify body points (e.g., joint estimation via mean-shift) between and/or along the identified body segments, such as the top of the head, top of the neck, shoulders, elbows, wrists, fingertips, knees, ankles, tips of the toes, etc. Each of the body points identified in a set of 3D images may be used to determine a movement pattern associated with that body point, as will be further described below in reference to FIG. 3D. In some embodiments, a skeletal structure of the user may be constructed by connecting the identified body points within each 3D image.

Figure 3D:
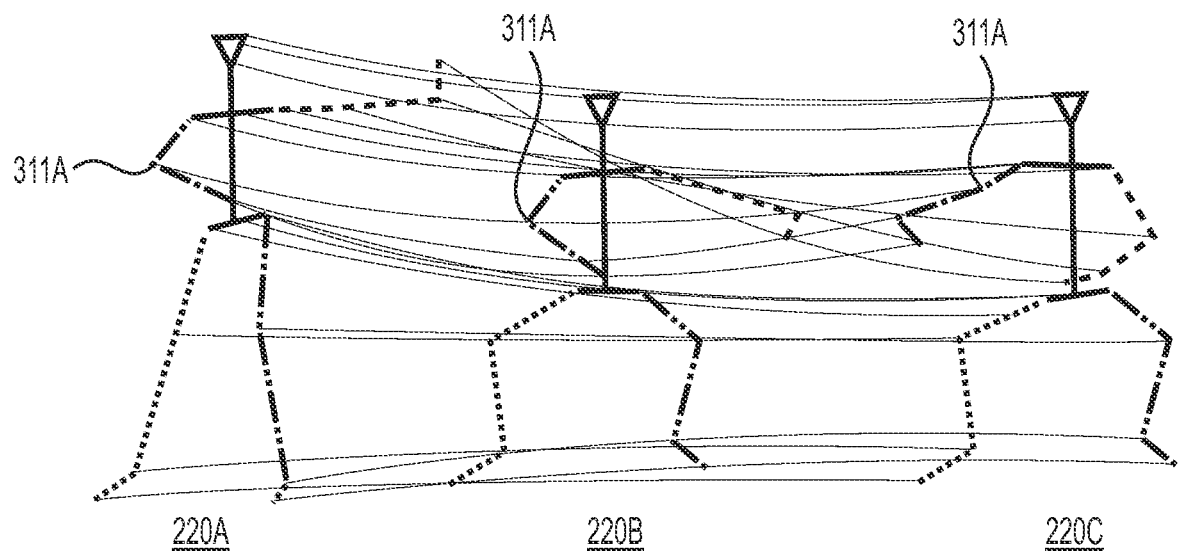
FIG. 3D depicts an exemplary process of identifying movement patterns based on the 3D images of the user making the signature move, according to one aspect of the present disclosure.

FIG. 3D depicts an exemplary process of identifying movement patterns based on the 3D images of the user making the signature move. In particular, FIG. 3D depicts that a particular body point identified from pose 220A may be connected to a corresponding body point identified from pose 220B, and the body point identified from pose 220B may be connected to another corresponding body point identified from pose 220C, in order to deduce a movement pattern associated with that particular body point. For example, a right elbow 311A identified from the first pose 220A may be connected to the corresponding right elbow 311A identified from the second pose 220B, and the right elbow 311A identified from the second pose 220B may be connected to the corresponding right elbow 311A identified from the third pose 220C. Therefore, the line that connects the body points 311A among multiple poses (e.g., 220A, 220B, and 220C) may represent the user's movement pattern associated with the body point 311A. By generating digital representations of such lines for all or a portion of the body points identified from the 3D images, the user movement signature authentication server 160 may be able to determine the movement pattern associated with each body point. While techniques presented herein commonly discuss certain techniques as being performed with 2D images and certain techniques as being performed with 3D images, the 3D techniques may be performed with 2D images, and the 2D techniques may be performed with 3D images. For example, techniques discussed in relation to FIGS. 3A-3D above may be performable with 2D images.

Figure 4:
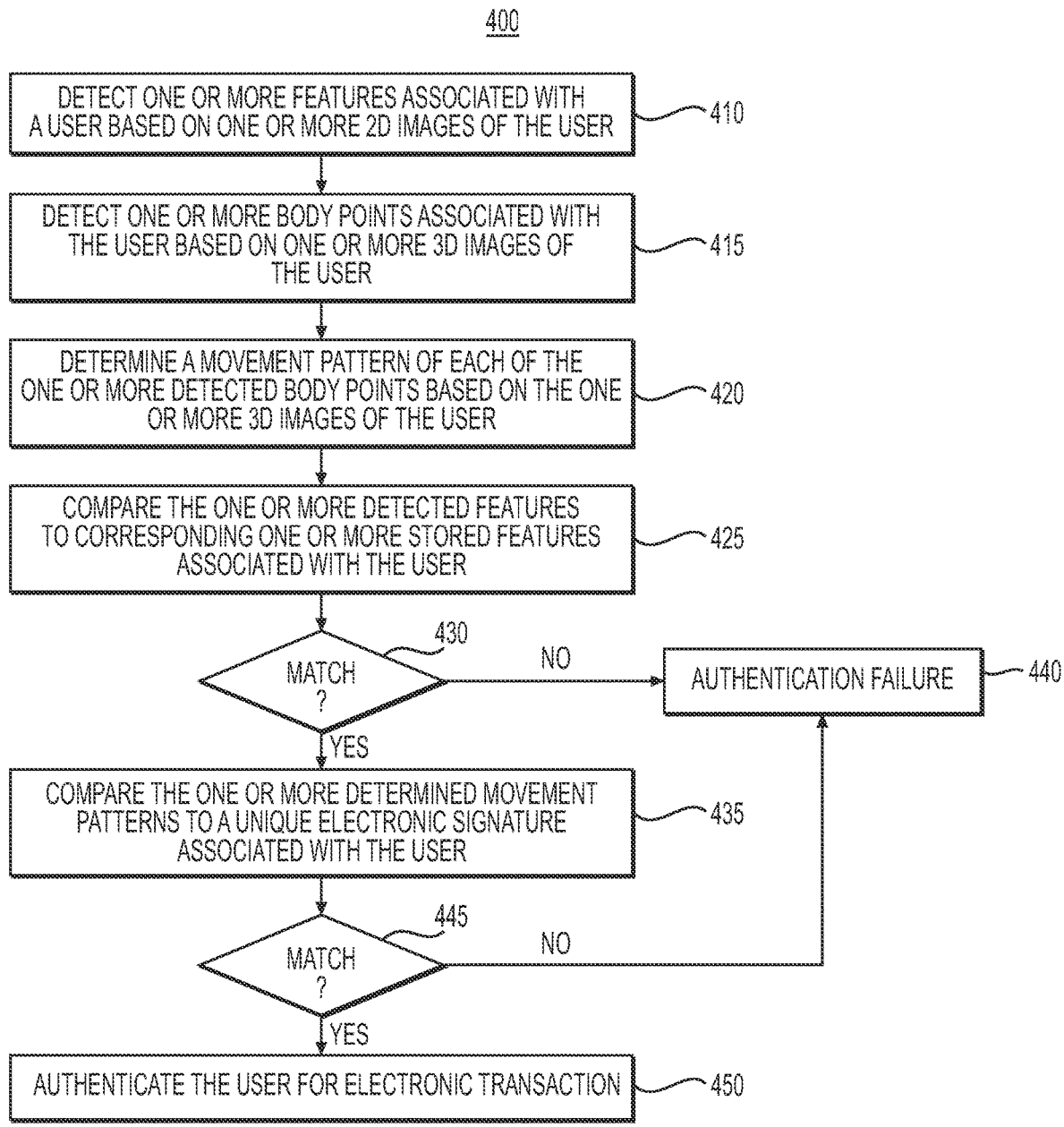
FIG. 4 depicts a flowchart of an exemplary method of authenticating a user based on user movements, according to one aspect of the present disclosure.

FIG. 4 depicts a flowchart of an exemplary method of authenticating a user based on user movements. Notably, method 400 may be performed by the user movement signature authentication server 160. In one embodiment, method 400 may be performed in response to a user providing a payment vehicle (or payment vehicle information) via an electronic payment interface. Once the user provides the payment vehicle, a movement-based authentication data entry interface may be initiated by the user movement signature authentication server 160. In response to a prompt, the user may provide a signature move, and the motion capture system 200 may utilize one or more image and depth sensors to capture user movements, and generate 2D and/or 3D images.

At step 410, the user movement signature authentication server 160 may detect one or more features associated with a user based on one or more 2D images. The features may include, but may not be limited to, a face, a facial feature, a skin color, a hair color, a fingerprint, etc. At step 415, the user movement signature authentication server 160 may detect one or more body points associated with the user based on one or more 3D images. The user movement signature authentication server 160 may additionally detect one or more body segments associated with the user based on the one or more 3D images, and may also construct a skeletal structure associated with the user by intelligently connecting body points within each image. Example processes of identifying body points/segments and generating a skeletal structure are explained above in reference to FIGS. 3A-3C. In some embodiments, the user movement signature authentication server 160 may also identify features of the constructed skeletal structure, such as, e.g., a height, arm span, body segment lengths of the skeletal structure, etc. At step 420, the user movement signature authentication server 160 may determine a movement pattern of each of the one or more detected body points based on the one or more 3D images of the user. Example process of determining the movement patterns of the user are explained above in reference to FIG. 3D.

With continuing reference to FIG. 4, at step 425, the user movement signature authentication server 160 may compare the one or more detected features to corresponding one or more stored features (i.e., reference features) associated with the user. The reference features may be stored in a data storage of the user movement signature authentication server 160. For instance, a detected face of the user may be compared to a reference face of the user to determine whether they match. One or more other features may also be compared. Additionally or alternatively, one or more features identified from the generated skeletal structure of the user may be compared to corresponding one or more features of a stored skeletal structure (i.e., a reference skeletal structure) associated with the user. At step 430, if the user movement signature authentication server 160 determines that the one or more detected features do not match the corresponding one or more stored features, method 400 may proceed to step 440, where the user movement signature authentication server 160 concludes that the authentication failed. The user movement signature authentication server 160 may perform other actions such as, e.g., notifying the user of the authentication failure (i.e., sending an authentication failure notification to a point of sale terminal), notifying the card issuing bank of the authentication failure, terminating the authentication process, etc. Conversely, if the user movement signature authentication server 160 determines that the one or more detected features match the corresponding one or more stored features, method 400 may proceed to step 435.

At step 435, the user movement signature authentication server 160 may compare the one or more determined movement patterns to a unique electronic signature associated with the user. The unique electronic signature may comprise one or more stored movement patterns that correspond to the one or more determined (i.e., detected) movement patterns. In essence, the one or more determined movement patterns, which may be identified from the user's signature move, may be compared to the one or more stored movement patterns (i.e., reference movement patterns) constituting the unique electronic signature. At step 445, if the user movement signature authentication server 160 determines that the one or more determined movement patterns do not match the unique electronic signature associated with the user, method 400 may proceed to step 440, where the user movement signature authentication server 160 concludes that the authentication failed. On the other hand, if the user movement signature authentication server 160 determines that the one or more determined movement patterns match the unique electronic signature associated with the user, method 400 may proceed to step 450, where the user movement signature authentication server 160 may authenticate the user for one or more electronic transactions. For instance, the user movement signature authentication server 160 may direct a corresponding payment application (e.g., payment application 145A or payment application 145B) to send an electronic transaction authorization request to a payment network. The electronic transaction authorization request may comprise a transaction amount, a primary account number identifier (or a previously-generated token associated with the primary account), a merchant identifier, an issuer identifier, etc.

In one embodiment, the step of determining a match between the one or more detected features and the one or more stored features, and/or between the one or more determined movement patterns and the unique electronic signature (step 435 in FIG. 4) may be performed using a machine learning model (e.g., machine learning classifier). In other words, the match determination may be performed using a machine learning model. For instance, the user movement signature authentication server 160 may train a machine learning model to identify i) the detected features that match the stored features and ii) the movement patterns that match the unique electronic signature. The user movement signature authentication server 160 may then store the trained machine learning model in a local or remote storage.

Figure 5:
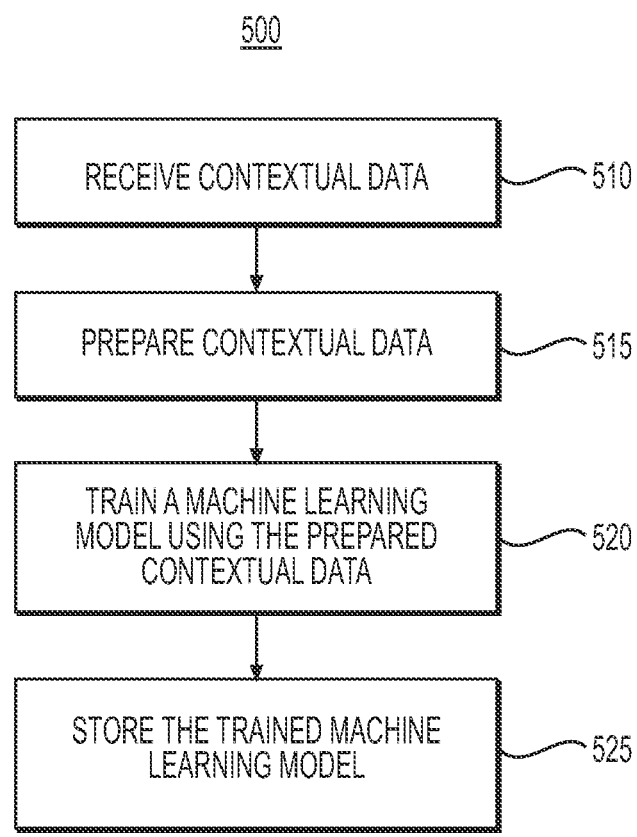
FIG. 5 depicts a flowchart of an exemplary method of training a machine learning model, according to one aspect of the present disclosure.

FIG. 5 is a flowchart illustrating an exemplary method 500 of training a machine learning model, according to one aspect of the present disclosure. In particular, the steps of method 500 may be performed by the user movement signature authentication server 160. The trained machine learning model may be used to analyze features and/or movement patterns of a user, and to determine whether the features and/or movement patterns match stored features and/or a unique electronic signature (comprising signature movement patterns, i.e., genuine movement patterns) previously set up by the user, respectively.

At step 510, the user movement signature authentication server 160 may receive contextual data. The contextual data may comprise data relating to features and/or movement patterns of the user. For instance, the contextual data may be representative of the features and/or movement patterns of the user, and may comprise data received from the motion capture system (i.e., one or more sensors of the motion capture system) and/or may comprise data further processed or refined subsequent to being received from the motion capture system. The contextual data may be associated with known genuine and/or forged features, and/or known genuine and/or forged movement patterns, and may be used as training data. A reason for including contextual data associated with both the genuine and forged features/movement patterns may be to train the machine learning model to more accurately distinguish between genuine and forged features/movement patterns.

At step 515, the user movement signature authentication server 160 may prepare the received contextual data for model training. Data preparation may involve randomizing or sequencing the ordering of the contextual data, visualizing the contextual data to identify relevant relationships between different variables, identifying any data imbalances, splitting the contextual data into two parts where one part is for training a model and the other part is for validating the trained model, de-duplicating, normalizing, compressing (e.g., Discrete Cosine Transform (DCT), Discrete Fourier Transform (DFT), etc.), representing similarity or dissimilarity between sample features/movement patterns and genuine features/movement patterns in a vector form, labeling instances (e.g., vectors) as genuine and/or forged, correcting errors in the contextual data, and so on.

Once the contextual data is prepared (step 515), at step 520, the user movement signature authentication server 160 may train a machine learning model using the prepared contextual data. In one embodiment, the machine learning model may be trained using the vectors generated in step 515. A trained machine learning model could analyze contextual data to determine whether certain feature(s) and/or movement pattern(s) are genuine (i.e., the feature(s) and/or movement pattern(s) match the genuine feature(s) and/or movement pattern(s)) or forged (i.e., the feature(s) and/or movement pattern(s) do not match the genuine feature(s) and/or movement pattern(s), or more closely resemble the forged feature(s) and/or movement pattern(s)). At step 525, the user movement signature authentication server 160 may store the trained machine learning model in a local or remote storage. The trained machine learning model may then be used by the user movement signature authentication server 160 to verify the features and/or movement patterns of the user.

In some embodiments, the detected movement patterns may be normalized for authentication purposes. For example, if a user's unique electronic signature comprises moving the arm in two loops, normalization may mean that the absolute size of the two loops is not taken into account for authentication purposes. Rather, for authentication it may only be important that the two loops are a predetermined size relative to each other, at least within a predetermined threshold. Normalization may involve relativizing the magnitude of signals received from various sensors, and/or relativizing the magnitude of the various signals received from a single sensor. For example, if detected movement patterns of a user are faster or slower than the movement patterns of the unique electronic signature (for example, if the user is making the movements faster or slower than usual), the user may still be authenticated if the detected movement patterns consistently reflect the increased amplitude/speed. A limit may be placed on this normalization. For example, a user may be permitted to perform the movements faster than the movement patterns of the unique electronic signature, but may be prohibited from performing the movements outside of a predetermined range. For instance, a user may be permitted to perform the movements 50% slower or 50% faster than the movement patterns of the unique electronic signature and still be authenticated, but the authentication may fail if the user performs the movements outside of this range.

It should be noted that a match between detected feature(s) and stored feature(s), and/or a match between detected movement pattern(s) and the movement patterns of the unique electronic signature, may be determined using any technique suitable for determining a similarity between the detected feature(s) and the stored feature(s), and/or between the detected movement pattern(s) and the movement patterns of the unique electronic signature. Throughout the current disclosure, a match may mean the detected feature(s) and/or movement pattern(s) correlating to the stored feature(s) and/or movement patterns of the unique electronic signature within a predetermined threshold of differences. For example, the predetermined threshold may be a relative threshold (e.g., the detected features and/or movement patterns being at least 95% similar to the stored features and/or movement patterns of the unique electronic signature, the speed of the detected movement patterns being at least 50% faster or slower than the speed of the movement patterns of the unique electronic signature, etc.) or a dimensional threshold (e.g., the dimensions of the detected body points (e.g., body point heights, body segment lengths, etc.) being within 2 inches from the dimensions of the body points represented in the unique electronic signature, etc.). The threshold values may not be limited to the specific threshold values discussed herein, but may be any value determined by a user or a computing machine. A match may be determined using one or more predetermined thresholds. In other words, a combination of predetermined thresholds may be used to determine whether the detected feature(s) and/or movement pattern(s) match the stored feature(s) and/or movement pattern(s) of the unique electronic signature to a sufficient degree in several aspects (i.e., overall movement patterns, movement speed, body dimensions, etc.).

For ease of understanding, the following are exemplary scenarios in which the disclosed embodiments may be utilized.

Movement-Based Signature Authentication in a Web Environment

A user logs into a website using a consumer device. After selecting items for purchase, the user moves to the checkout area of the website (i.e., an electronic payment interface) and provides payment account information. The user is then asked to provide authentication data using a motion capture system, which is in communication with or a part of the consumer device. For example, the motion capture system may comprise one or more image and/or depth sensors, coupled to a smart phone or a laptop/desktop computer of the user. The user makes a signature move comprising a sequence of movements that may be analyzed for comparison with a unique electronic signature. If the signature move matches the unique electronic signature, a payment authorization request is transmitted to a payment network for further processing.

Movement-Based Signature Authentication in a Brick-and-Mortar Store

A customer in a store is waiting in line to pay for an item. The customer reaches a point of sale terminal to make a payment. After the item is scanned and a payment vehicle is provided by the customer, the point of sale terminal presents a prompt for the user to provide authentication data. A motion capture system comprising one or more image and/or depth sensors is coupled to the point of sale terminal. The user makes a signature move. The motion capture system uses face recognition to confirm that the customer is the actual owner of the payment vehicle. The motion capture system also uses 3D motion capture technique to detect the signature move and compare it to a unique electronic signature associated with the customer. Upon successful completion of both authentication steps, a payment authorization request is transmitted to a payment network for further processing.

Movement-Based Signature Authentication in a Virtual Reality (VR) Environment

A user plays a VR game using a VR system/headset. In response to the user's selection of an item for purchase, the user is presented with an in-game electronic payment interface. Upon providing a payment vehicle, the user is prompted to provide authentication data in the form of a signature move. A motion capture system, which is in communication with or a part of the VR system/headset, captures feature(s) and/or movement patterns of the user. The feature(s) and/or movement patterns are compared to corresponding stored feature(s) and stored movement patterns (i.e., unique electronic signature) associated with the user. Upon determining that the compared features and movement patterns match, a payment authorization request is transmitted to a payment network for further processing.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 6 illustrates an implementation of a general computer system designated 500. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. The computer system 600 may operate to perform the functions of any of the systems depicted in the network environment 100.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 600 may further include a display unit 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 170 can communicate voice, video, audio, images, or any other data over the network 170. Further, the instructions 624 may be transmitted or received over the network 170 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 170, external media, the display 610, or any other components in system 600, or combinations thereof. The connection with the network 170 may be a physical connection, such as a wired Ethernet connection or may be established wirelessly as discussed below. Likewise, the additional connections with other components of the system 600 may be physical connections or may be established wirelessly. The network 170 may alternatively be directly connected to the bus 508.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 170. The network 170 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 170 may include wide area networks (WAN), such as the Internet, local area networks (LAN), campus area networks, metropolitan area networks, a direct connection such as through a Universal Serial Bus (USB) port, or any other networks that may allow for data communication. The network 170 may be configured to couple one computing device to another computing device to enable communication of data between the devices. The network 170 may generally be enabled to employ any form of machine-readable media for communicating information from one device to another. The network 170 may include communication methods by which information may travel between computing devices. The network 170 may be divided into sub-networks. The sub-networks may allow access to all of the other components connected thereto or the sub-networks may restrict access between the components. The network 170 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method comprising:
generating, by one or more processors utilizing a virtual reality system, a virtual reality environment rendered on a display of a virtual reality device and including an interactive interface that is presented upon selection of a virtual object including an item for purchase during an execution of a virtual reality game, wherein one or more motion capture sensors in communication with the virtual reality system captures a movement pattern of a user by detecting and tracking one or more user features and/or one or more user movements within a three-dimensional space;

processing, by the one or more processors, one or more two-dimensional images of the user to determine one or more features associated with the user;

processing, by the one or more processors, one or more three-dimensional images of the user to extract one or more body segments and identify one or more body points associated with each of the one or more body segments;

determining, by the one or more processors, the movement pattern associated with each of the one or more body points by sequentially connecting each of the one or more body points to their respective body points identified in a series of poses in the one or more three-dimensional images;

comparing, by the one or more processors, the movement pattern to a unique electronic signature upon determining the one or more features match one or more stored features associated with the user; and authenticating, by the one or more processors, the user for an electronic payment process for purchasing the virtual object upon determining the movement pattern match the unique electronic signature.

2. The computer-implemented method of claim 1, wherein processing the one or more two-dimensional images of the user comprises:
generating, by the one or more processors, a data entry interface in a device associated with a service provider and/or the user; and
capturing, by the one or more processors utilizing an image sensor, the one or more two-dimensional images of the user for determining the one or more features associated with the user,
wherein the one or more features include facial features and/or biometric data of the user.

3. The computer-implemented method of claim 1, wherein processing the one or more three-dimensional images of the user comprises:
generating, by the one or more processors, a movement-based authentication data entry interface in a device associated with a service provider and/or the user; and
capturing, by the one or more processors utilizing an image sensor and/or a depth sensor, the one or more three-dimensional images of the user for determining the movement pattern.

4. The computer-implemented method of claim 3, wherein the one or more body segments and the one or more body points between the one or more body segments are identified from the one or more three-dimensional images utilizing a trained machine learning model.

5. The computer-implemented method of claim 4, wherein comparing the movement pattern to the unique electronic signature comprises:
generating, by the one or more processors, a skeletal structure of the user based on the one or more body points in the one or more three-dimensional images of the user; and
comparing, by the one or more processors, the skeletal structure to a stored skeletal structure of the user.

6. The computer-implemented method of claim 5, wherein comparing the skeletal structure to the stored skeletal structure comprises:
comparing, by the one or more processors, a height of the skeletal structure to a height of the stored skeletal structure.

7. The computer-implemented method of claim 6, wherein comparing the skeletal structure to the stored skeletal structure comprises:

comparing, by the one or more processors, one or more lengths of the one or more body segments of the skeletal structure to one or more lengths of corresponding one or more body segments of the stored skeletal structure.

8. The computer-implemented method of claim 5, wherein determining the movement pattern based on the one or more body points comprises:
generating, by the one or more processors, a movement curve based on the sequentially connected body points in the one or more three-dimensional images.

9. The computer-implemented method of claim 1, wherein determining the movement pattern match the unique electronic signature comprises:
training, by the one or more processors, a machine learning model utilizing contextual data associated with one or more users for determining genuine or forged movement patterns; and
determining, by the one or more processors utilizing the trained machine learning model, the movement pattern as genuine to authenticate the user for the electronic payment process.

10. The computer-implemented method of claim 1, wherein the unique electronic signature includes one or more of poses and a sequence of continuous movements performed by the user.

11. A system comprising:
one or more processors; and
at least one non-transitory computer readable medium storing instructions which, when executed by the one or more processors, cause the one or more processors to perform operations comprising:
generating, utilizing a virtual reality system, a virtual reality environment rendered on a display of a virtual reality device and including an interactive interface that is presented upon selection of a virtual object including an item for purchase during an execution of a virtual reality game, wherein one or more motion capture sensors in communication with the virtual reality system captures a movement pattern of a user by detecting and tracking one or more user features and/or one or more user movements within a three-dimensional space;
processing one or more two-dimensional images of the user to determine one or more features associated with the user;
processing one or more three-dimensional images of the user to extract one or more body segments and identify one or more body points associated with each of the one or more body segments;
determining the movement pattern associated with each of the one or more body points by sequentially connecting each of the one or more body points to their respective body points identified in a series of poses in the one or more three-dimensional images;
comparing the movement pattern to a unique electronic signature upon determining the one or more features match one or more stored features associated with the user; and
authenticating the user for an electronic payment process for purchasing the virtual object upon determining the movement pattern match the unique electronic signature.

12. The system of claim 11, wherein processing the one or more two-dimensional images of the user comprises:
generating a data entry interface in a device associated with a service provider and/or the user; and
capturing, utilizing an image sensor, the one or more two-dimensional images of the user for determining the one or more features associated with the user,
wherein the one or more features include facial features and/or biometric data of the user.

13. The system of claim 11, wherein processing the one or more three-dimensional images of the user comprises:
generating a movement-based authentication data entry interface in a device associated with a service provider and/or the user; and
capturing, utilizing an image sensor and/or a depth sensor, the one or more three-dimensional images of the user for determining the movement pattern.

14. The system of claim 13, wherein the one or more body segments and the one or more body points between the one or more body segments are identified from the one or more three-dimensional images utilizing a trained machine learning model.

15. The system of claim 14, wherein comparing the movement pattern to the unique electronic signature comprises:
generating a skeletal structure of the user based on the one or more body points in the one or more three-dimensional images of the user; and
comparing the skeletal structure to a stored skeletal structure of the user.

16. The system of claim 15, wherein comparing the skeletal structure to the stored skeletal structure comprises:
comparing a height of the skeletal structure to a height of the stored skeletal structure.

17. The system of claim 16, wherein comparing the skeletal structure to the stored skeletal structure comprises:
comparing one or more lengths of the one or more body segments of the skeletal structure to one or more lengths of corresponding one or more body segments of the stored skeletal structure; and
generating a movement curve based on the sequentially connected body points in the one or more three-dimensional images.

18. A non-transitory computer readable medium, the non-transitory computer readable medium storing instructions which, when executed by one or more processors, cause the one or more processors to perform operations comprising:
generating, utilizing a virtual reality system, a virtual reality environment rendered on a display of a virtual reality device and including an interactive interface that is presented upon selection of a virtual object including an item for purchase during an execution of a virtual reality game, wherein one or more motion capture sensors in communication with the virtual reality system captures a movement pattern of a user by detecting and tracking one or more user features and/or one or more user movements within a three-dimensional space;
processing one or more two-dimensional images of the user to determine one or more features associated with the user;
processing one or more three-dimensional images of the user to extract one or more body segments and identify one or more body points associated with each of the one or more body segments;
determining the movement pattern associated with each of the one or more body points by sequentially connecting each of the one or more body points to their respective body points identified in a series of poses in the one or more three-dimensional images;

comparing the movement pattern to a unique electronic signature upon determining the one or more features match one or more stored features associated with the user; and authenticating the user for an electronic payment process for purchasing the virtual object upon determining the movement pattern match the unique electronic signature.

19. The non-transitory computer readable medium of claim 18, wherein processing the one or more two-dimensional images of the user comprises:

generating a data entry interface in a device associated with a service provider and/or the user; and capturing, utilizing an image sensor, the one or more two-dimensional images of the user for determining the one or more features associated with the user, wherein the one or more features include facial features and/or biometric data of the user.

20. The non-transitory computer readable medium of claim 18, wherein processing the one or more three-dimensional images of the user comprises:

generating a movement-based authentication data entry interface in a device associated with a service provider and/or the user; and capturing, utilizing an image sensor and/or a depth sensor, the one or more three-dimensional images of the user for determining the movement pattern.

* * * * *